United States Patent [19]

Takahashi et al.

[11] Patent Number: 5,881,333
[45] Date of Patent: Mar. 9, 1999

[54] FUNCTION-EXPANDABLE IMAGE FORMING APPARATUS

[75] Inventors: Toshiyuki Takahashi; Toshihiko Watanabe; Yukihiro Ito; Hiroshi Wada; Shoji Hirano, all of Osaka, Japan

[73] Assignee: Mita Industrial Co., Ltd., Osaka, Japan

[21] Appl. No.: 862,408

[22] Filed: May 23, 1997

[30] Foreign Application Priority Data

May 31, 1996 [JP] Japan .................................. 8-138388

[51] Int. Cl.$^6$ ........................... G03G 15/00; G03G 21/00

[52] U.S. Cl. ................................................ 399/2; 399/90

[58] Field of Search ............................ 399/1, 2, 90, 126

[56] References Cited

U.S. PATENT DOCUMENTS

| | | | |
|---|---|---|---|
| 4,734,789 | 3/1988 | Smith et al. | 399/1 X |
| 4,868,918 | 9/1989 | Watanabe | 399/1 |
| 5,454,066 | 9/1995 | Tsai | 399/2 X |
| 5,493,365 | 2/1996 | Matsui et al. | 399/1 |

*Primary Examiner*—Fred L. Braun
*Attorney, Agent, or Firm*—Beveridge, DeGrandi, Weilacher & Young, LLP

[57] ABSTRACT

An image forming apparatus is readily provided with an additional function besides its principal function and therefore is adupted for function expansion. A control operation for the additional function is enabled on condition that a component required for the actuation of the additional function is attached to the image forming apparatus. The principal function may be a copying function, and the additional function may be a facsimile function. The component for the function expansion is preferably constructed so as to be snap attached to the image forming apparatus.

8 Claims, 5 Drawing Sheets

F I G. 3
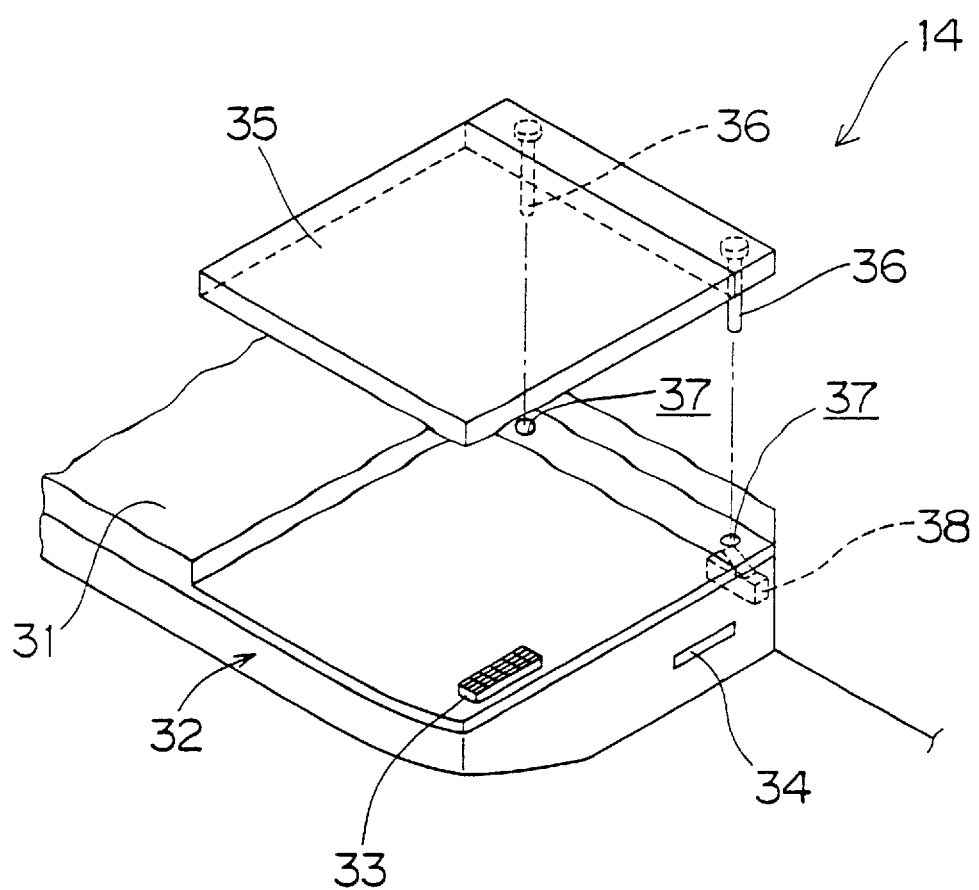

FUNCTION-EXPANDABLE IMAGE FORMING APPARATUS

BACKGROUND OF THE INVENTION

1. Field of the Invention

The present invention relates to an image forming apparatus adapted to be optionally provided with an additional function such as a facsimile function besides a principal function as a copying machine and, more particularly, to means for readily providing the additional function to the apparatus for function expansion without a complicated modification work.

2. Description of Related Arts

In recent years, multi-function image forming apparatuses have been provided, which each have a plurality of functions to serve as a copying machine, a facsimile machine and a printer.

Some of the multi-function image forming apparatuses have a copying function as a principal function and are adapted to be optionally provided with an additional function such as a facsimile function. Such an image forming apparatus is preferably constructed so that the function expansion can be achieved in a simple and easy manner. More specifically, where the facsimile function is to be added to an image forming apparatus having the copying function as the principal function, the function expansion is preferably achieved by a simple setup operation by a user, which does not require a modification work on interconnections and circuit boards in the apparatus by a service person or an expert engineer.

SUMMARY OF THE INVENTION

It is an object of the present invention to provide an image forming apparatus which is adapted to be readily provided with an additional function besides a principal function for function expansion.

In the image forming apparatus of the present invention, a control operation for the additional function is (enabled) on condition that a component required for the actuation of the additional function is attached to the image forming apparatus.

The principal function of the image forming apparatus may be a copying function, and the additional function may be a facsimile function.

The component for the function expansion is preferably constructed so as to be (snap) attached to the image forming apparatus.

With this arrangement, the component indispensable for the actuation of the additional function can readily be attached to the apparatus in one step. The function expansion can be achieved by this simple attaching operation. Where the facsimile function is additionally provided to the image forming apparatus having the copying function as the principal function, the function expansion can be achieved, for example, by attaching to the apparatus an NCU for the facsimile function. This is realized by a simple setup operation by a user, dispensing with a modification work on interconnections and circuit boards in the apparatus by a service person.

In accordance with one embodiment of the present invention, the image forming apparatus includes an interconnection for the additional function preliminarily provided in the main body thereof, a sensor for detecting the connection of the component to the interconnection for the additional function, and a control section for actuating the additional function on the basis of a detection signal from the sensor.

With this arrangement, the interconnection for the additional function is preliminarily provided in the apparatus and, when the sensor detects the attachment of the component required for the actuation of the additional function, the control section assuredly achieves the function expansion on the basis of the detection signal from the sensor. Further, the preliminary provision of the interconnection for the additional function does not entail a remarkable cost increase.

The foregoing and other objects, features and effects of the present invention will become more apparent from the following description of the preferred embodiments with reference to the attached drawings.

BRIEF DESCRIPTION OF THE DRAWINGS

FIG. 3 is a perspective view illustrating major portions of an auxiliary operation section to which a principal function panel is attached;

DESCRIPTION OF THE PREFERRED EMBODIMENTS

Figure 1:
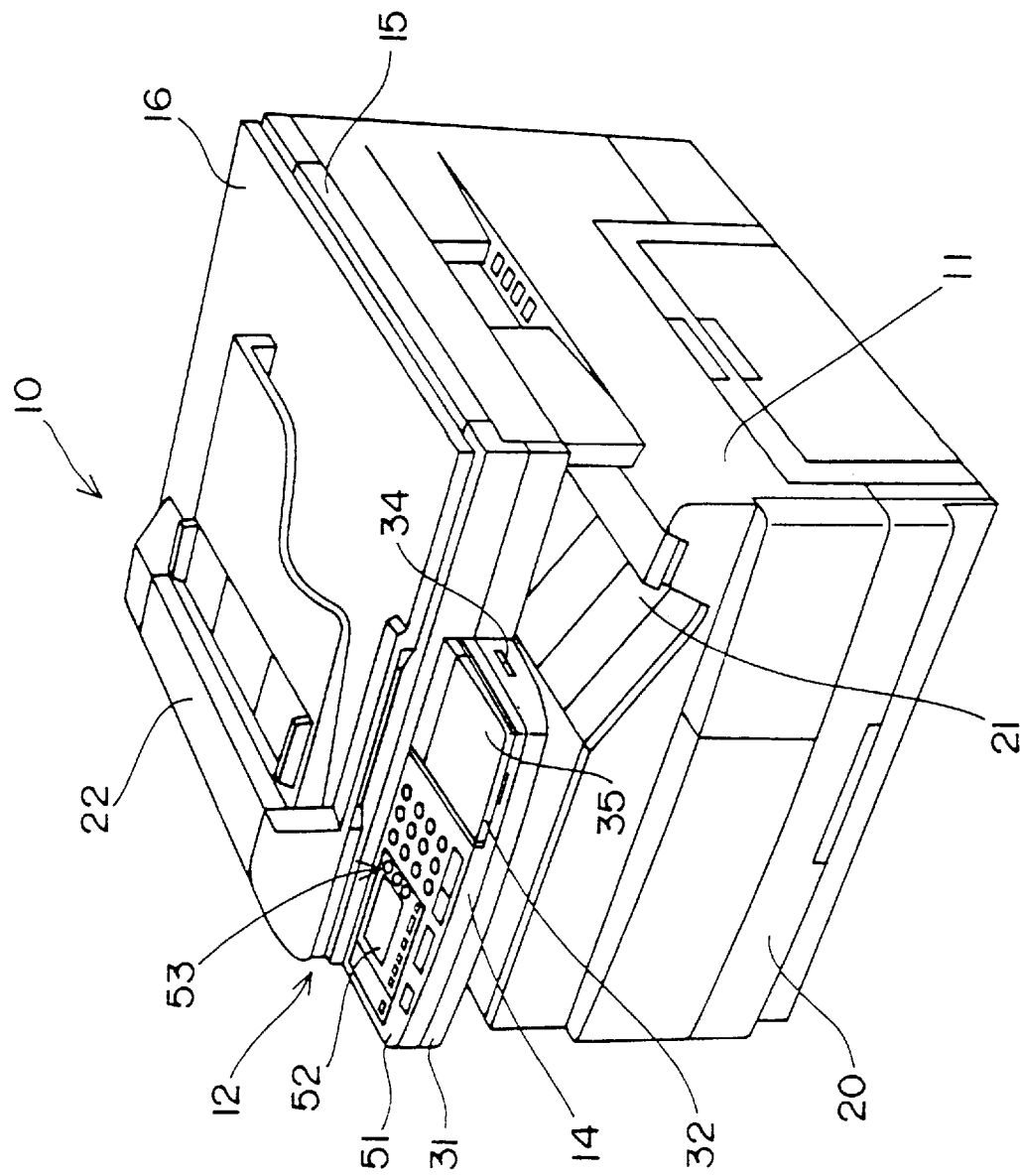
FIG. 1 is a perspective view illustrating the exterior of an apparatus according to one embodiment of the present invention.
Figure 2:
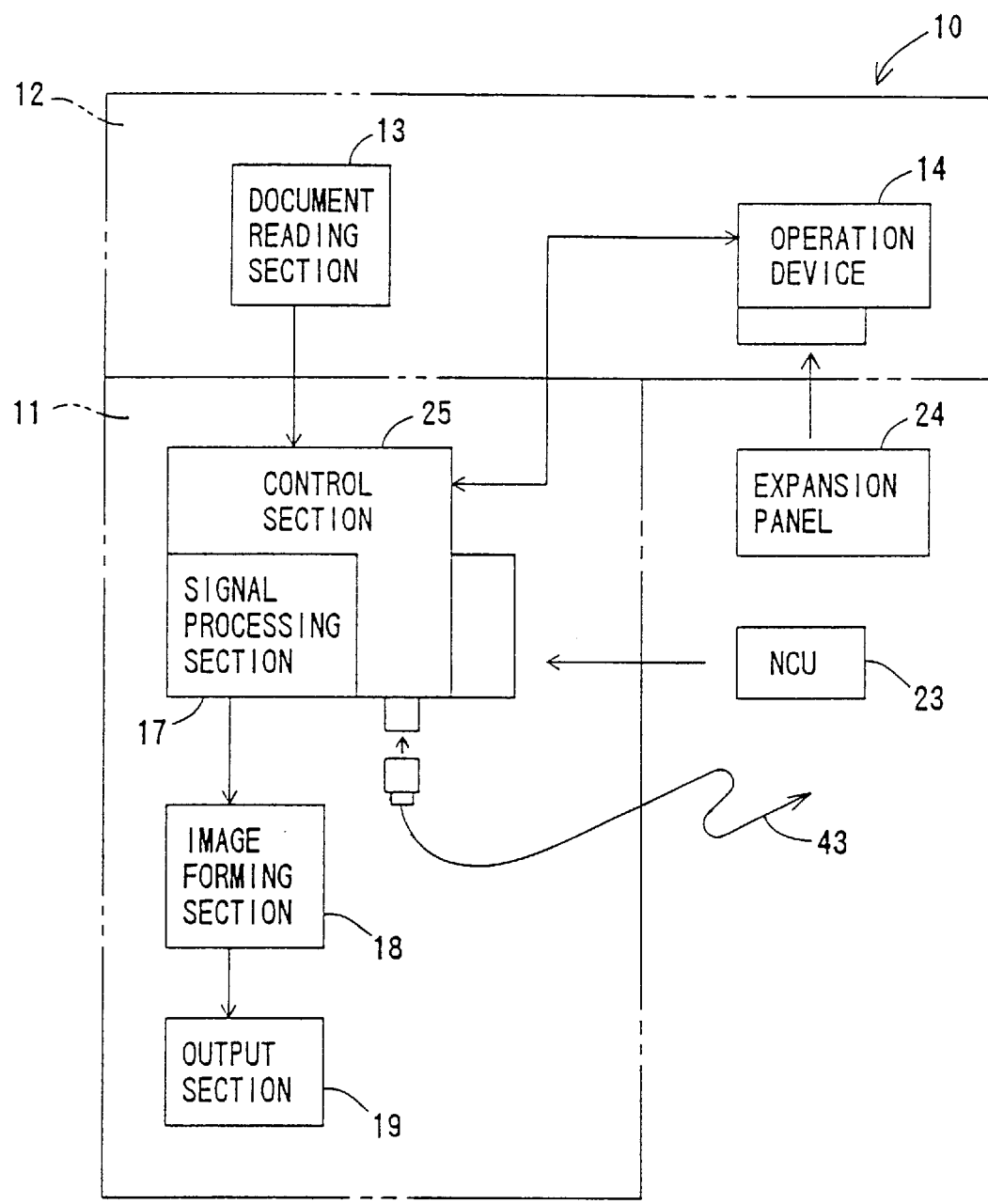
FIG. 2 is a block diagram schematically illustrating the internal construction of the apparatus.

FIG. 1 is an overall perspective view illustrating a multi-function image forming apparatus (hereinafter referred to simply as "apparatus") 10 according to one embodiment of the present invention. FIG. 2 is a block diagram schematically illustrating the internal construction of the apparatus.

The apparatus 10 has a lower unit 11 and an upper unit 12. The upper unit 12 has a document reading section 13 and an operation device 14 for operating the apparatus 10. The document reading section 13 includes a document platen 15 on which a document original is placed when the apparatus 10 is used as a copying machine or a facsimile machine, a document holding member 16 for holding the document original, and an automatic document feeder (ADF) 22, and a scanner portion (not shown) for optically reading an image of the document original.

The lower unit 11 includes a control section 25 having a signal processing section 17 for processing image signals indicative of the image read by the scanner portion, an image forming section 18 for transferring a document original image on a sheet on the basis of image data generated by the signal processing section 17, and an output section 19 for outputting the sheet bearing the image transferred and fixed thereon by a fixing unit (not shown). In this embodiment, the control section 25 serves both as principal function controlling means for controlling respective components for a copying function and as additional function controlling means for controlling operations of respective components for a facsimile function.

A sheet is taken out of a sheet retainer 20, and discharged into a sheet discharge tray 21 of the output section 19 after a copy is made on the sheet. The sheet discharge tray 21 is disposed on the side of the lower unit 11, so that the discharged sheet can be visually checked from the top as shown in FIG. 1.

A feature of the apparatus 10 is that the apparatus has a principal function as a copying machine and, as required, is provided with an additional function as a facsimile in a very simple manner. More specifically, the apparatus 10 serves only as a copying machine in the state shown in FIG. 1. When the facsimile function is to be added to the apparatus, relatively expensive optional components, such as an NCU (network control unit) 23 and a facsimile control circuit panel (expansion panel) 24, required for the facsimile function are attached to the apparatus (see FIG. 4). Thus, the function expansion can readily be achieved by a user.

Whether the apparatus 10 is used as a copying machine or as a facsimile machine, the same process sequence is employed for image formation in which a document original is read by the scanner portion to generate image signals and, after the image signals are processed, an image is formed on the basis of the processed signals and outputted. Therefore, electrical components and interconnections of the apparatus 10 can be used in common when the apparatus 10 is used as a copying machine and as a facsimile machine.

In this embodiment, an interconnection dedicated for the facsimile function as well as the components and interconnections for common use for the copying function and the facsimile function are incorporated in the apparatus 10 at the stage of the production of the apparatus 10.

The common components are, of course, indispensable for the copying function and also serve for the facsimile function. Since the common components are indispensable for the actuation of the principal function as a copying machine, the provision of the common components does not entail an unreasonable increase in the component cost of the apparatus 10. Further, the interconnection dedicated for the facsimile function is inexpensive, so that the provision of the facsimile interconnection at the stage of the production of the apparatus 10 does not entail a remarkable increase in the production cost.

If the expensive NCU 23 and expansion panel 24 for the facsimile function are initially incorporated in the apparatus 10 to provide the apparatus 10 with the facsimile function for the function expansion, a remarkable cost increase is inevitable. Therefore, the components required for the facsimile function are preferably provided as optional components which, if necessary, are purchased and attached to the apparatus by a user to allow the apparatus to be used as a facsimile machine. Thus, the facsimile function can be provided to the apparatus 10 as required without an increase in the cost of the apparatus.

FIG. 3 is an enlarged perspective view illustrating major portions of the operation device 14. Referring to FIGS. 1 to 3, the operation device 14 has a main operation section 31 for operating the apparatus 10, and an expansion operation section 32 for the function expansion. The main operation section 31 has a plate 51, a display portion 52 and operation keys 53 of various kinds provided on the plate 51.

Referring to FIG. 3, a connector 33 is provided at a terminal of the facsimile interconnection and exposed on the expansion operation section 32. Though not shown, the facsimile interconnection is preliminarily provided in the expansion operation section 32. The expansion operation section 32 further includes a terminal 34 for connecting an NCU.

A cover panel 35 is provided on the expansion operation section 32. The cover panel 35 covers the expansion operation section 32 when the apparatus 10 is used only as a copying machine. The cover panel 35 has fixing pins 36 projecting therefrom. The operation section 32 has fixing holes 37 for receiving the fixing pins 36, and limit switches 38 respectively disposed in the innermost positions of the fixing holes 37.

When the cover panel 35 is attached to the expansion operation section 32 with the fixing pins 36 inserted into the fixing holes 37, the fixing pins 36 turn on the limit switches 38. A signal outputted by the turn on of the limit switches 38 is applied to the control section 25 (see FIG. 2), which in turn recognizes that the apparatus 10 serves only as a copying machine (or as a copying machine and a printer), whereby the apparatus is controlled so as not to perform a facsimile operation. In this state, the control section 25 is (enabled) to operate as the principal function controlling means and is prohibited from operating as the additional function controlling means.

The apparatus 10 is allowed to serve as a facsimile machine for the function expansion in the following manner.

Figure 4:
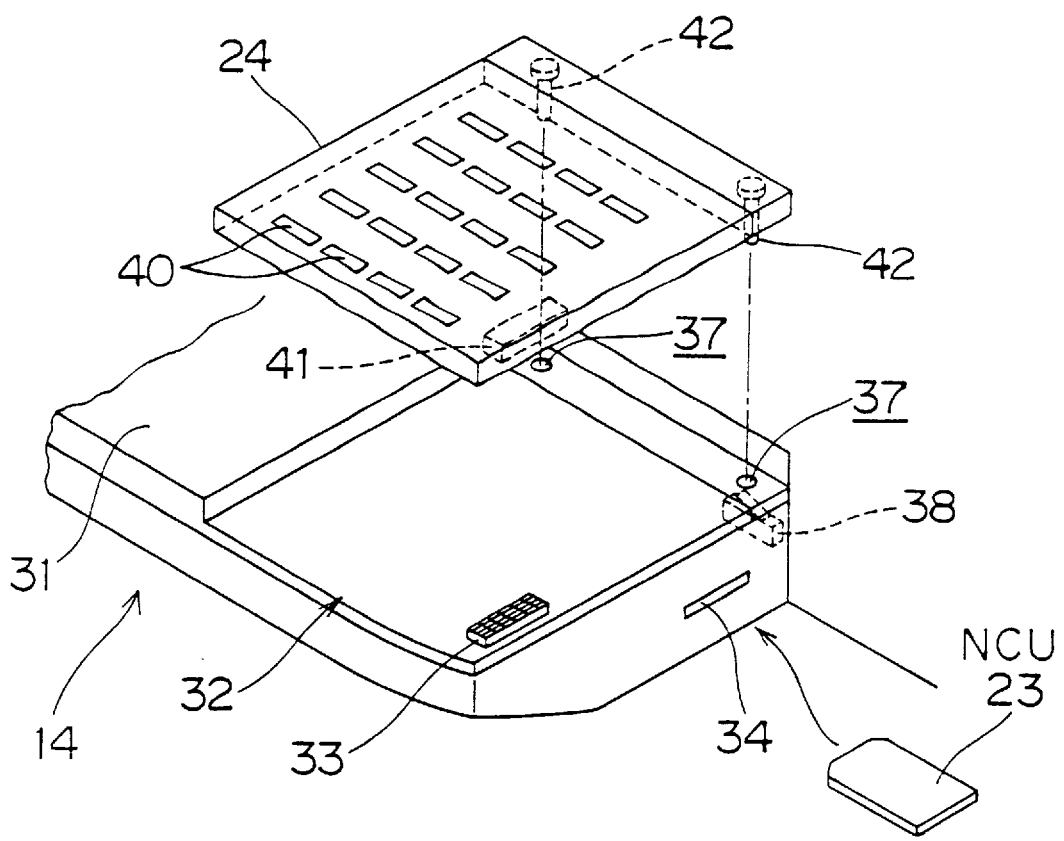
FIG. 4 is a perspective view illustrating major portions of the auxiliary operation section to which a function expansion panel is attached.

The cover panel 35 is first removed. This turns off the limit switches 38, whereby the control section 25 (enables) the apparatus 10 to be used as a facsimile machine. More specifically, the control section 25 is permitted to operate as the additional function controlling means. Subsequently, the expansion panel 24 is attached to the expansion operation section 32 instead of the cover panel 35 as shown in FIG. 4.

The expansion panel 24 has the same exterior configuration as the cover panel 35, and can be attached to the expansion operation section 32 of the operation device 14. The expansion panel 24 has a plurality of operation keys 40 to be operated only when the apparatus 10 is used as a facsimile machine, and interconnections including a connector 41 for connecting the operation keys 40 to the expansion operation section 32.

The expansion panel 24 has fixing pins 42 projecting therefrom and each having substantially the same configuration as the fixing pins 36 of the cover panel 35. The fixing pins 42 serve for positioning the expansion panel 24 with respect to the expansion operation section 32, and each have a length shorter than the fixing pins 36. Therefore, the fixing pins 42 do not turn on the limit switches 38 with the expansion panel 24 attached to the expansion operation section. The attachment of the expansion panel 24 engages the connector 41 with the connector 33 to allow the respective operation keys 40 to be effected.

In turn, the NCU 23 is attached to the apparatus, and a cable 43 (see FIG. 2) is connected to the apparatus to establish connection to a telephone line. Thus, the apparatus 10 can be used as a facsimile machine. Although the connection terminal 34 for the NCU 23 is provided on the side wall of the expansion operation section 32 in this embodiment, the connection terminal 34 may be provided in any desired position which permits the NCU 23 to be attached to the apparatus in a snap.

In this embodiment, the facsimile interconnection is preliminarily provided in the expansion operation section 32. The expansion panel 24 and the NCU 23 required for the actuation of the facsimile function are provided as optional components, which are retrofitted to the apparatus 10 to allow the apparatus 10 to be used as a facsimile machine. Since the expansion panel 24 and the NCU 23 can readily be attached in one step, the function expansion can be achieved by a simple setup operation by a user without a laborious interconnection work by a service person. The "one-step" attaching operation does not mean an operation such that the inside of the apparatus 10 is opened up so as to attach the additional component to the apparatus 10, but herein means a simple operation such that a component exposed to the outside of the apparatus 10 is replaced with the additional component or the additional component is snapped (snap attached) to the apparatus 10.

Although the disabling and enabling of the additional function is achieved by the on and off of the limit switches 38 in this embodiment, proximity sensors may be employed instead of the limit switches 37 if the fixing pins 36 and 42 are made of a metal. Thus, the use of the limit switches 37 or the proximity sensors as the function expansion means permits the control device to readily perform the function expansion control.

In this embodiment, the fixing pins 36 of the cover panel 35 are longer than the fixing pins 42 of the expansion panel 24. Conversely, the fixing pins of the cover panel 35 may be shorter than the fixing pins of the expansion panel 24 so that the on and off state of the limit switches 38 is set opposite to that of the aforesaid case.

The apparatus 10 may be constructed so that the engagement of the connectors 33 and 41 can be detected. That is, the control section 25 (see FIG. 2) may be constructed so as to directly detect the engagement of the connectors 33 and 41. In such a case, the limit switches 38 can be dispensed with. Similarly, since the NCU 23 is an indispensable component where the apparatus 10 is used as a facsimile machine, the attachment of the NCU 23 may be detected via the limit switches or the proximity sensors or directly by the control section 25. In such a case, the apparatus 10 is used only as a copying machine when the NCU 23 is not attached, and the apparatus 10 can perform the facsimile function when the NCU 23 is attached.

Figure 5:
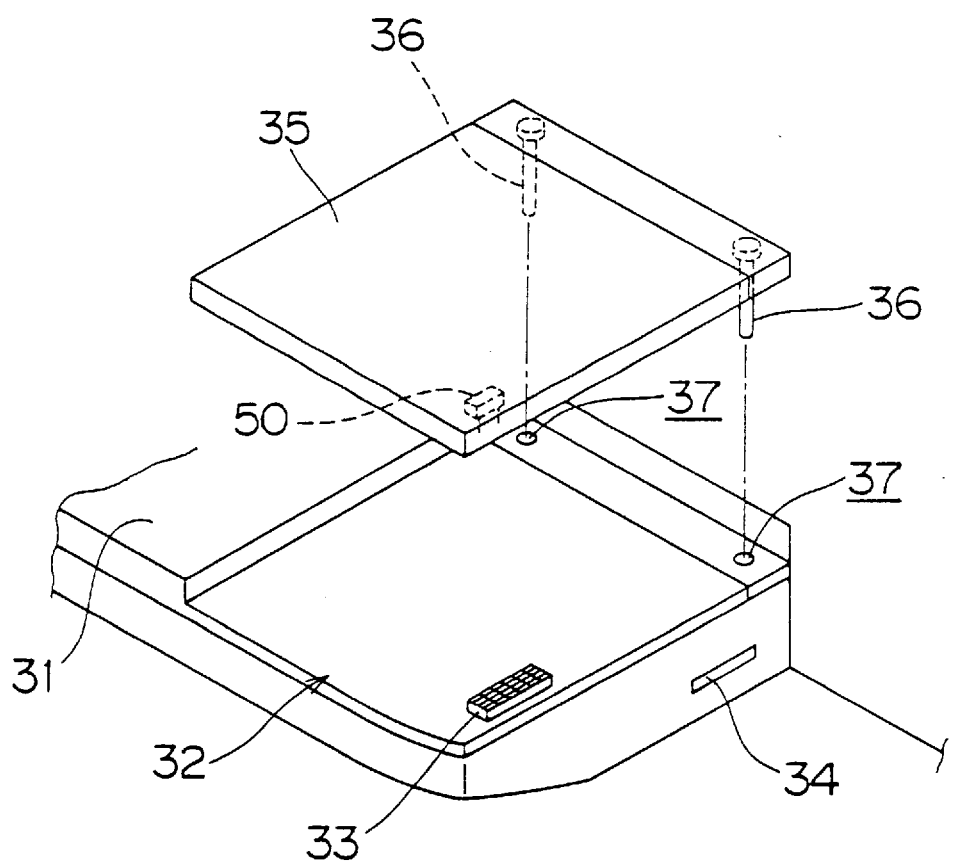
FIG. 5 is a perspective view illustrating major portions of an auxiliary operation section in which a design modification is made to means for allowing the apparatus to perform only the principal function.

Alternatively, the facsimile function may be disabled by short-circuiting a predetermined terminal pin of the connector 33 with a short-circuit terminal 50 provided in a predetermined position of the cover panel 35 as shown in FIG. 5, when the panel 35 is attached to the apparatus.

Although an explanation has been given to a case where the facsimile function is to be added to the apparatus in the aforesaid embodiment, functions other than the facsimile function may be added in substantially the same manner.

In the aforesaid embodiment, the apparatus has the copying function as the principal function and the facsimile function as the additional function. The copying function may be provided as the additional function to an apparatus having the facsimile function as the principal function.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application is based on the application No. 8-138388 filed in Japan, the entire disclosure of which is incorporated hereinto by reference.

What is claimed is:

1. An image forming apparatus, comprising:

principal function controlling means for actuating a predetermined principal function;

additional function controlling means for actuating an additional function different from the principal function;

function expansion means for enabling the additional function controlling means to perform a control operation on condition that an additional function operation panel required for the actuation of the additional function is attached to the image forming apparatus, and an operation device for the principal function, the operation device having an expansion region provided in a predetermined Position thereof for receiving the additional function operation panel, and wherein the expansion region is covered with a cover panel, wherein the additional function operation panel is attached to the expansion region after the cover panel is removed, and wherein at least one of the cover panel and the additional function operation panel is provided with a detection member for distinctively detecting the cover panel and the operation panel by means of a sensor.

2. An image forming apparatus as set forth in claim 1, wherein the principal function is a copying function, and the additional function is a facsimile function.

3. An image forming apparatus as set forth in claim 1, wherein the additional function operation panel is constructed so as to be snap attached to the image forming apparatus.

4. An image forming apparatus as set forth in claim 1, wherein the function expansion means includes:

an interconnection for the additional function preliminarily provided in a main body of the image forming apparatus;

a sensor for detecting connection of the component to the interconnection for the additional function; and means for enabling the additional function controlling means to perform the control operation on the basis of a detection signal from the sensor.

5. An image forming apparatus as set forth in claim 4, wherein the sensor is a limit switch for detecting a presence of a predetermined member in a predetermined position.

6. An image forming apparatus as set forth in claim 4, wherein the sensor is a proximity switch for detecting a presence of a predetermined metal member.

7. An image forming apparatus as set forth in claim 1, wherein the cover panel has a fixing pin as the detection member, and the sensor is provided in association with the expansion region to detect the fixing pin of the cover panel.

8. An image forming apparatus as set forth in claim 7, wherein the additional function operation panel has a positioning pin provided in a position corresponding to the position of the fixing pin, and the sensor is adapted to detect the fixing pin of the cover panel but not to detect the positioning pin of the additional function operation panel.

* * * * *